A. E. WYLIE.
STALK CUTTER ATTACHMENT.
APPLICATION FILED APR. 7, 1919.

1,329,154.

Patented Jan. 27, 1920.

Inventor
A. E. Wylie.
By Joseph Ashley
Attorney

UNITED STATES PATENT OFFICE.

ARTHUR E. WYLIE, OF AXTELL, TEXAS, ASSIGNOR OF ONE-HALF TO J. G. DAVIS, OF LIMESTONE COUNTY, TEXAS.

STALK-CUTTER ATTACHMENT.

1,329,154.  Specification of Letters Patent.  Patented Jan. 27, 1920.

Application filed April 7, 1919. Serial No. 288,189.

*To all whom it may concern:*

Be it known that I, ARTHUR E. WYLIE, a citizen of the United States, residing at Axtell, in the county of McLennan and State of Texas, have invented certain new and useful Improvements in Stalk-Cutter Attachments, of which the following is a specification.

This invention relates to new and useful improvements in stalk cutter attachments for plows.

The object is to provide a cutter attachable to the beam in front of the plow to cut stalks and the like and turn them under the soil as the plowing is done, thus saving an extra operation and the labor thereof.

In carrying out the invention certain novel features of construction are involved and these will be hereinafter more particularly pointed out.

The invention will be more readily understood from a reading of the following specification and by reference to the accompanying drawings, in which an example of the invention is shown and wherein.

Figure 1:
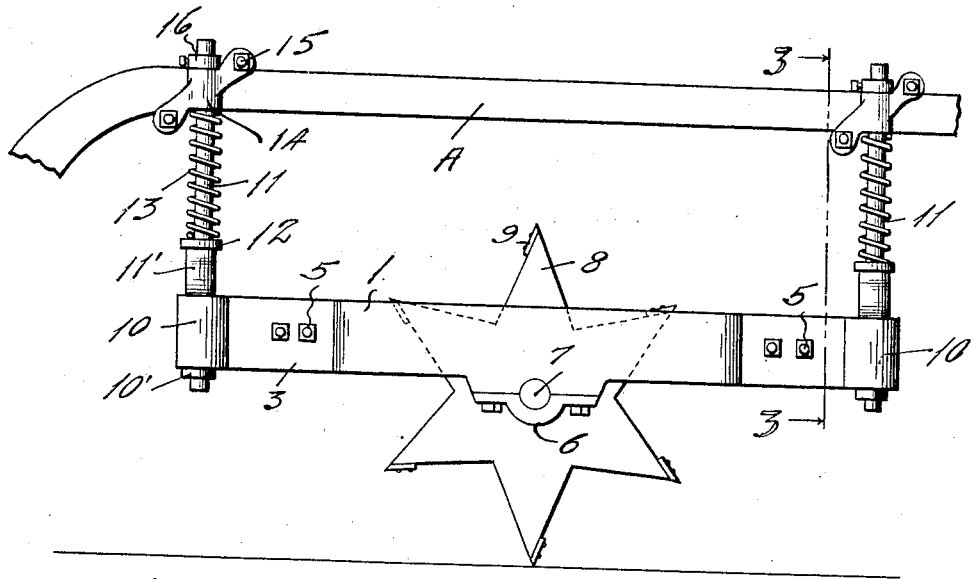
Figure 1 is a side elevation of the cutter attached to the beam of a plow.
Figure 2:
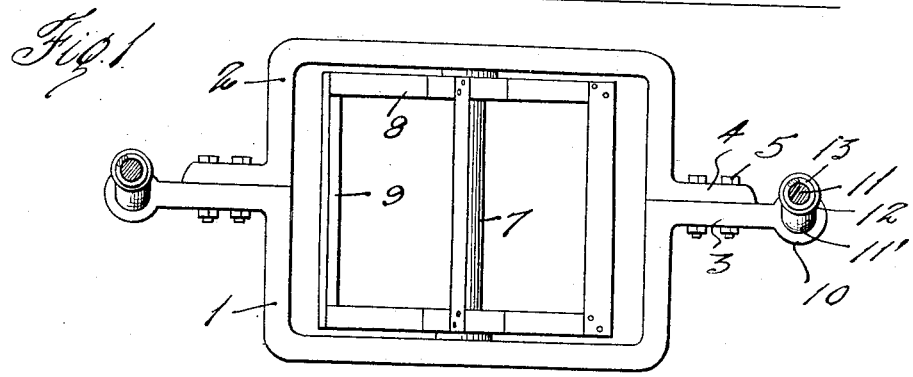
Fig. 2 is a plan view of the attachment.
Figure 3:
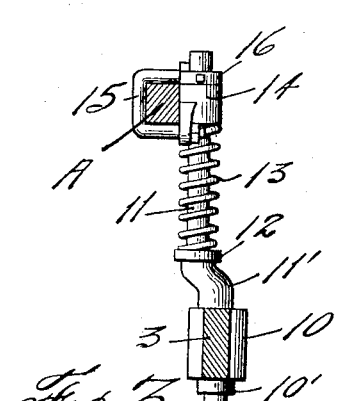
Fig. 3 is a sectional detail on the line 3—3 of Fig. 1.

In the drawings the numeral 1 designates a frame member and 2 a corresponding frame member, said members forming a rectangular frame. The member 1 has forwardly and rearwardly directed arms 3 against which lugs 4 of the member 2 are fastened by bolts 5. The members are securely fastened together and may be separated by removing the bolts. Each member carries at the center of its outer side, a depending bearing box 6 receiving the reduced end of an axle 7. Star shaped flanges 8 are fastened on the axle within the frame and adjacent the sides of the members. The points of the flanges are connected by transverse knives 9 projecting radially from the said points. The construction of the frame and arrangement of the cutter is important. The arms 3 project beyond the lugs 4 and carrying eyes 10. The arms are positioned so that the longitudinal center line of the frame will pass centrally through the eyes. Hangers 11 have offset lower ends engaging in the eyes, the offset portions 11' immediately above the eyes being enlarged to prevent upward displacement of the frame. The hangers are fastened in the eyes by collars 10'. The upper ends of the hangers are slidable in clamp-collars 14, which are secured to the plow beam A in advance of the plow by U-bolts 15. Collars 16 fastened on the upper end hangers bear on the clamp-collars. Just above the enlarged portion 11' a flange 12 is provided on each hanger and supports a coiled spring 13 bearing at its upper end against the clamp-collar. By means of the coiled springs the cutter may yield upward to pass over obstructions and is also held to the ground. The springs also tend to take the load of the beam off of the cutter. The off-set portions of the hangers are used to position the frame with relation to the plow share and the wheels of a riding lister or other implement.

The operation of the stalk cutter attachment serves to cut the stalks and other refuse on the ground just ahead of the plow, so that the cut parts will be turned under as the soil is plowed. The cutter will yield when necessary and is given sufficient downward pressure by the springs, to cut any stalk or the like encountered.

What I claim, is:

In a stalk cutter attachment for plows, the combination of a horizontal frame composed of two sections fastened together, a cutter mounted to revolve in the frame, arms extending forwardly and rearwardly from the ends of the frame, eyes at the outer ends of the arms, hangers having offset ends engaging in the eyes, clamp-collars for attachment to a plow beam, said clamp-collars slidably receiving the upper ends of the hangers, coiled springs supported on the hangers and engaging the clamp-collars, and means for supporting the hangers in the clamp-collars.

In testimony whereof I affix my signature.

ARTHUR E. WYLIE.